(12) United States Patent
Takagi

(10) Patent No.: US 6,249,243 B1
(45) Date of Patent: Jun. 19, 2001

(54) RADAR APPARATUS FOR USE ON VEHICLE

(75) Inventor: Makoto Takagi, Shizuoka-ken (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/457,330

(22) Filed: Dec. 9, 1999

(30) Foreign Application Priority Data

Dec. 10, 1998 (JP) .................................................. 10-351426

(51) Int. Cl.⁷ ...................................................... G01S 13/93
(52) U.S. Cl. ............................ 342/70; 342/90; 342/108; 342/109; 342/115; 342/145; 342/196
(58) Field of Search ................................. 342/70, 71, 72, 342/89, 90, 98, 99, 107, 108, 109, 111, 112, 113, 115, 116, 117, 128, 129, 133, 135, 139, 145, 146, 192, 196

(56) References Cited

U.S. PATENT DOCUMENTS 5,745,070 * 4/1998 Yamada .................................. 342/70
6,072,422 * 6/2000 Yamada .................................. 342/70

FOREIGN PATENT DOCUMENTS

02000180540 * 6/2000 (JP) ................................. G01S/13/52

* cited by examiner

Primary Examiner—John B. Sotomayor
(74) Attorney, Agent, or Firm—Finnegan, Henderson, Farabow, Garrett & Dunner, L.L.P.

(57) ABSTRACT

Provided is a radar apparatus for use on a vehicle and for detecting one target or two or more targets present in a scan range by scanning the scan range with a radar beam, which has a means for obtaining prior target data by scanning the scan range with the radar beam, a grouping means for carrying out grouping of the prior target data according to a predetermined condition to obtain group data, and a target recognition means for identifying the group data and prior target data remaining without being grouped, as detection data corresponding to respective targets and carrying out recognition of each target corresponding to each detection data. The grouping means makes provision of a plurality of predetermined conditions, selects one condition or two or more conditions according to position information of prior target data to be grouped, and carries out the grouping based on the condition(s) selected. This radar apparatus for use on the vehicle can accurately perform the grouping of point data.

4 Claims, 7 Drawing Sheets

RADAR APPARATUS FOR USE ON VEHICLE

BACKGROUND OF THE INVENTION

1. Field of the Invention

The present invention relates to a radar apparatus for use on a vehicle and for detecting an object (a target) present in a scan range by scanning the scan range with a radar beam.

2. Related Background Art

A known example of the technology concerning the radar apparatus of this type is one described in Japanese Patent Application Laid-Open No. 9-145883. In this conventional technology, grouping is carried out under a judgment that data with distances close to each other belongs to a single object.

There are, however, cases wherein several data with an equal distance originates in actual objects different from each other, depending upon their directions, and, conversely, there are also cases wherein several data with different distances originates in a single, actual object. Therefore, wrong recognition was sometimes resulted by the above-stated conventional technology of simply grouping data with nearly equal distances.

SUMMARY OF THE INVENTION

The present invention has been accomplished in order to solve the above problem and a radar apparatus according to the present invention is a radar apparatus for use on a vehicle and for detecting a target or two or more targets present in a scan range by scanning the scan range with a radar beam, the radar apparatus comprising means for obtaining prior target data by the scanning with the radar beam, grouping means for carrying out grouping of the prior target data according to a predetermined condition to obtain group data, and target recognition means for identifying the group data and the prior target data remaining without being grouped, as detection data corresponding to respective targets and carrying out recognition of each target corresponding to each detection data, wherein the grouping means makes provision of a plurality of predetermined conditions, selects a condition or two or more conditions according to position information of prior target data to be grouped, and carries out the grouping based on the condition or conditions thus selected.

Principal targets of the radar apparatus are vehicles running ahead and a plurality of target data is sometimes obtained corresponding to a single vehicle running ahead. In such a sense that one-to-one correspondence is not always achieved to the targets as described, the target data herein will be called prior target data.

The "grouping" means putting a plurality of such prior target data together, and how the plurality of prior target data against one preceding vehicle is distributed differs depending upon the position of the preceding vehicle.

In the radar apparatus of the present invention, the optimum grouping condition(s) of the prior target data can be selected according to the position information of the prior target data, whereby correspondence can be made accurate between the group data as the grouping result and an actual target.

When a plurality of prior target data is obtained from a certain preceding car present in the front direction or in a range of a lane on which the vehicle with the radar apparatus is running currently, there is a very high probability that each data results from the rear end of the preceding car. Thus the prior target data based on such a single target can be grouped into a group, using a necessary condition that their distances and relative speeds are approximately equal.

On the other hand, when a plurality of prior target data is obtained from a preceding car present obliquely ahead or outside the range of the currently running lane, the data is a mixture of data originating in the rear end of the preceding car and data originating in the side face of the preceding car. Since the rear end and the side face of the vehicle present obliquely ahead have different distances but a small difference between their angles of directions, the prior target data based on such a single target can be grouped into a group, using a necessary condition that their directional angles and relative speeds are approximately equal. The range of the currently running lane may be assumed to be a fixed range or may be acquired by lane shape acquiring means.

If a target width based on the group data is not less than a predetermined value and if at least a part thereof is off the width of the currently running lane obtained by the lane shape acquiring means, it is desirable to divide the pertinent group data into two new group data inside and outside the currently running lane.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
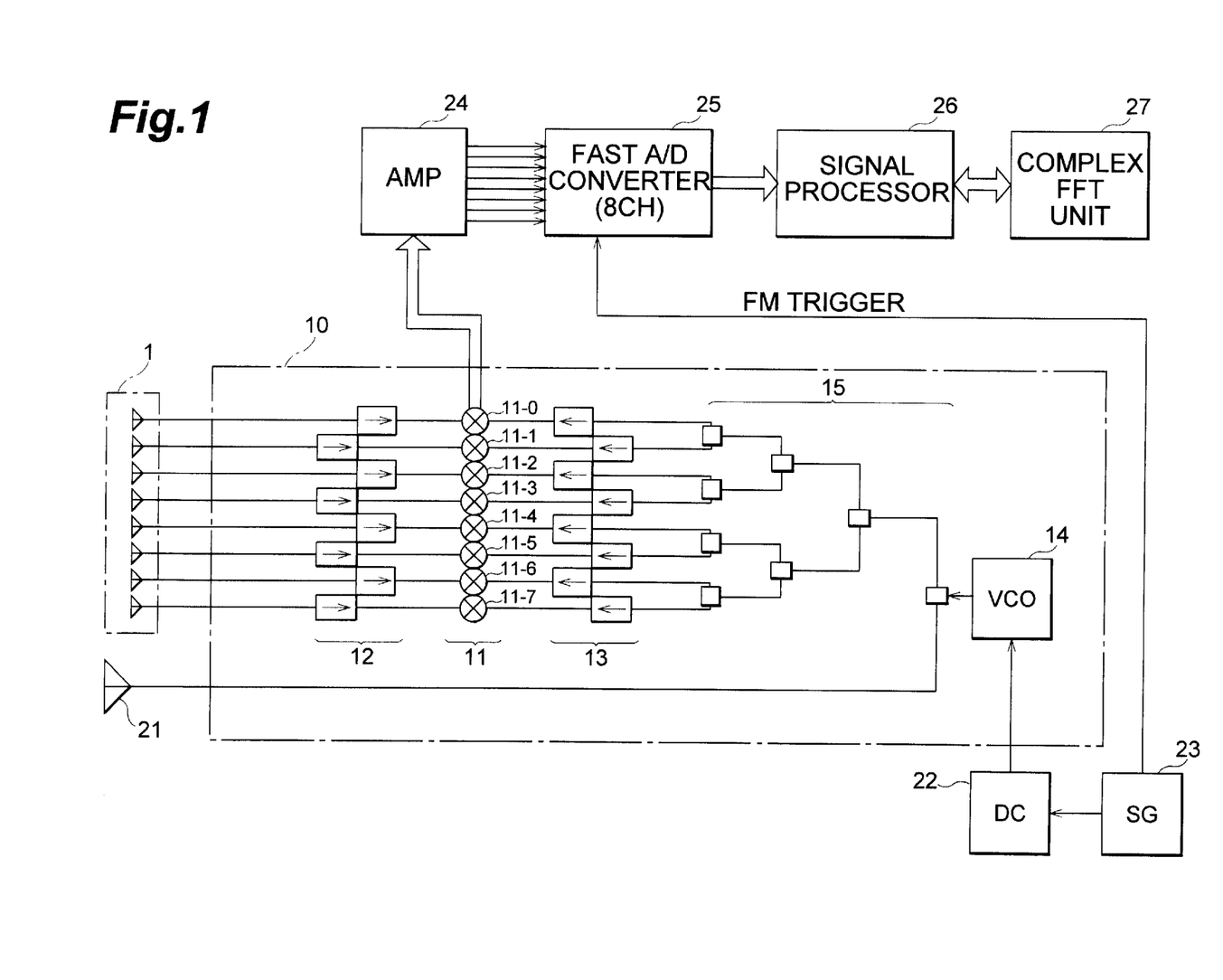
FIG. 1 is a block diagram to show the structure of a radar apparatus for use on a vehicle as an embodiment of the present invention.

FIG. 1 is a diagram to show the structure of a radar apparatus for use on a vehicle as an embodiment of the present invention. This radar apparatus for use on the vehicle is an FM-CW radar apparatus using a transmitted signal of frequency-modulated (FM) continuous wave (CW) and DBF (digital beamforming) radar apparatus which forms a radar beam by digital signal processing and scans the scan range with the radar beam.

An array antenna 1 for reception is composed of eight antenna elements corresponding to respective receiving channels. The antenna elements are connected via individual isolators constituting an isolator group 12 to respectively corresponding mixers 11-0 to 11-7.

Each of the mixers 11-0 to 11-7 works to mix part of the transmitted signal with a received signal arriving at each antenna element to obtain a beat signal. The transmitted signal component supplied as a local signal to the mixers 11-0 to 11-7 is supplied from voltage-controlled oscillator (VCO) 14 via branch circuit 15 and isolator group 13.

The oscillator 14 is a varactor control type Gunn diode oscillator having the center frequency of f0 (for example, 60 GHz), which outputs a modulated wave in the range of f0±(½)ΔF, based on a control voltage outputted from dc power supply 22 for modulation. The frequency modulation (FM) herein is triangular modulation in which frequency-increasing intervals (up intervals) and frequency-decreasing intervals (down intervals) continue alternately. In the up intervals the frequency increases linearly from f0−(½)ΔF, to f0+(½)ΔF, while in the down intervals the frequency decreases linearly from f0+(½)ΔF to f0−(½)ΔF in the same time as in the up intervals.

This frequency-modulated (FM) wave is supplied via the branch circuit 15 to a transmission antenna 21 to be radiated as a transmitted signal. In addition, as described above, the frequency-modulated wave is branched into eight channels as local signals and they are mixed with respective received signals of the eight channels in the respective mixers 11-0 to 11-7 to generate beat signals of the respective channels. The dc power supply 22 regularly alters its output voltage in a triangular wave pattern under control of signal source 23 for modulation.

In the rear stage of a high-frequency circuit 10 composed of the mixer group 11, isolator groups 12, 13, oscillator 14, and branch circuit 15, there are a low noise amplifier 24, a fast A/D converter 25, a signal processing unit 26, and a complex FFT arithmetic unit 27.

The low-noise amplifier (amp) 24 amplifies the beat signals of the eight channels outputted from the mixers 11-0 to 11-7 in parallel. The amp 24 incorporates a low-pass filter having the cut-off frequency of 77 kHz for anti aliasing.

The fast A/D converter 25 is a circuit for carrying out A/D conversion of the beat signals of the eight channels in parallel and at a time, which samples data at 200 kHz. At this sampling frequency, sampling is carried out at 128 points in each of the up interval and down interval of the triangular wave in the frequency modulation (FM).

Figure 2:
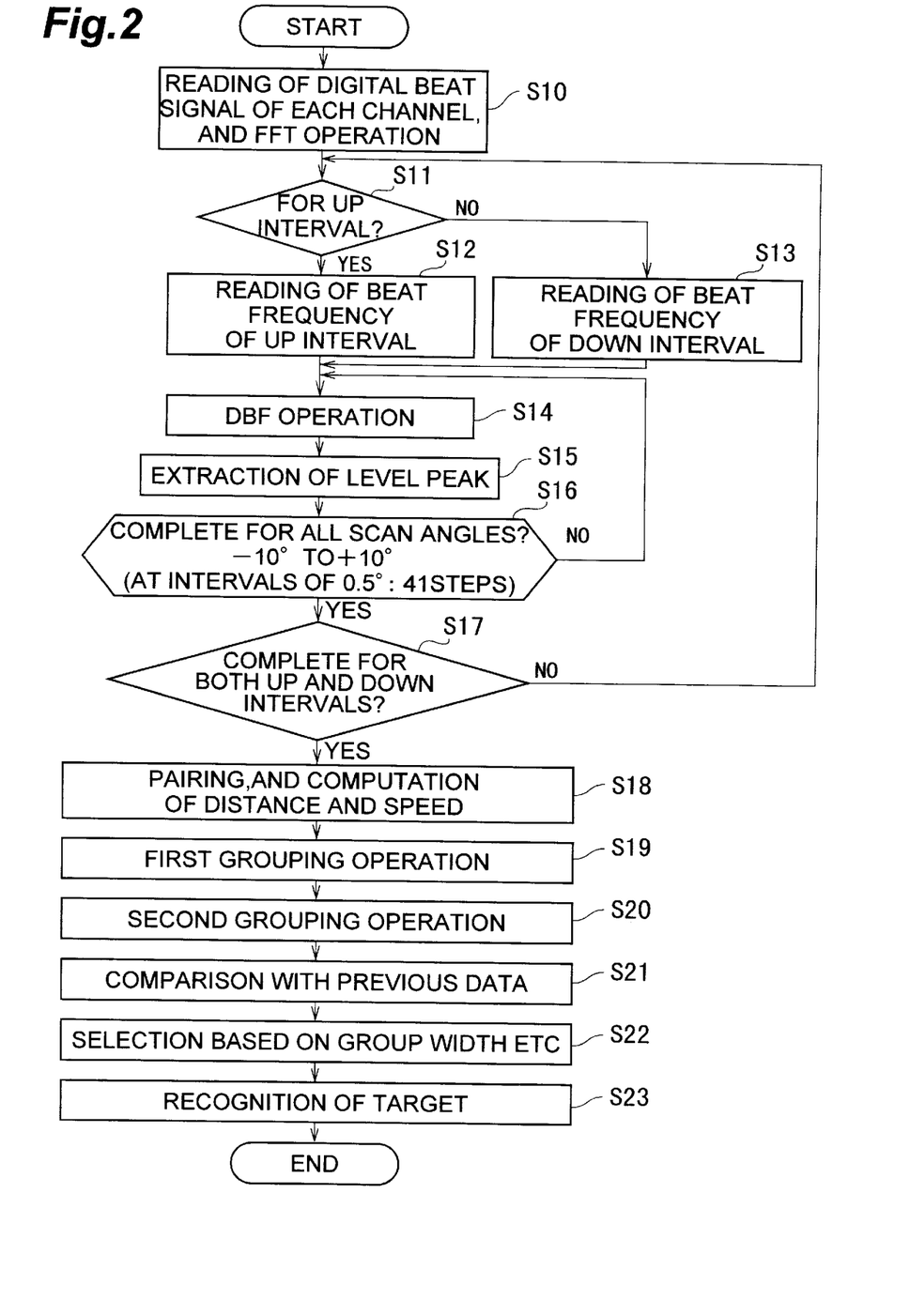
FIG. 2 is a flowchart to show the basic operation of the apparatus.

The signal processing unit 26 accepts a digital beat signal of each channel from the fast A/D converter 25 and carries out a variety of signal processing operations according to the flowchart of FIG. 2 to perform the recognition operation of target (object).

The complex FFT arithmetic unit 27 is an arithmetic operation unit for carrying out the complex FFT arithmetic operation among the series of processing operations in the signal processing unit 26 instead thereof, which receives the digital beat signal of each channel from the signal processing unit 26, carries out the complex FFT arithmetic operation therewith, and returns the result to the signal processing unit 26.

Procedures of the action of this apparatus will be described below referring to the flowchart of FIG. 2.

First, step S10 is a step of reading in the digital beat signal of each channel. Since the digital beat signals of the respective channels are obtained by carrying out the sampling at 128 points in each of the up interval and down interval in each channel, the total data read in is data at 2048 points; 128 (points) ×2 (intervals)×8 (channels)=2048. Based on these data, the FFT (fast Fourier transform operation) is carried out in each of the channels to obtain beat frequency information. All the beat frequency information obtained herein is stored in a memory in the signal processing unit 26. This beat frequency information of each channel includes phase information necessary on the occasion of DBF operation executed hereinafter.

Step S11 is a step of determining whether the various operations executed hereinafter are for the data of up interval or for the data of down interval. When this determination results in yes, i.e., when the following operations are for the up interval data, the processor moves to step S12 to read the digital beat frequency information of the up interval stored in step S10 to make provision for the next DBF operation.

Step S14 is a step of rotating the phase of the beat frequency information by digital signal processing in each channel to form a beam in one direction of a scan angle out of forty one directions obtained by dividing the range of −10° to +10° at intervals of 0.5°. Step S15 is a step of extracting a level peak against a variable of the beat frequency in the direction (scan angle θ) of the beam formed in step S14.

Step S16 is a step of determining whether DBF operation of step S14 and the level peak extracting operation of step S15 are completed for all the directions, i.e., for the forty one directions from −10° to +10°. When the level peak extraction is completed for all the directions, the processor transfers to step S17. Step S17 is a step of determining whether the above-stated level peak extraction is completed for the both of the up interval and the down interval. When it is completed, the processor moves to step S18.

Step S18 is a step of carrying out pairing between a level peak of the up interval and a level peak of the down interval having the same scan angle θ, and computing a distance and a relative speed from the beat frequencies of the level peaks thus paired.

Figure 3:
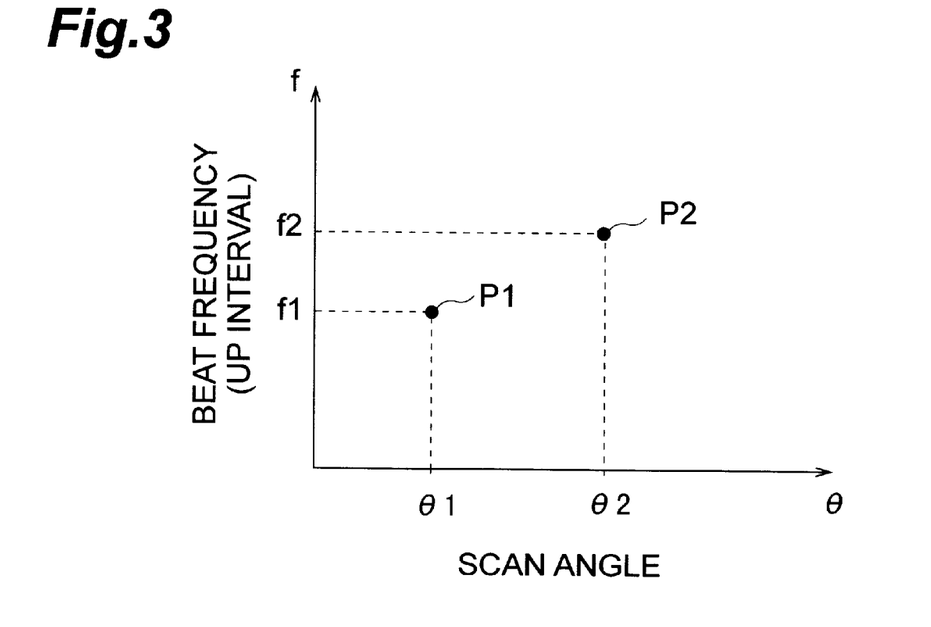
FIG. 3 is a graph for explaining pairing of level peaks and is a graph to show the relation between beat frequency in an up interval and scan angle.
Figure 4:
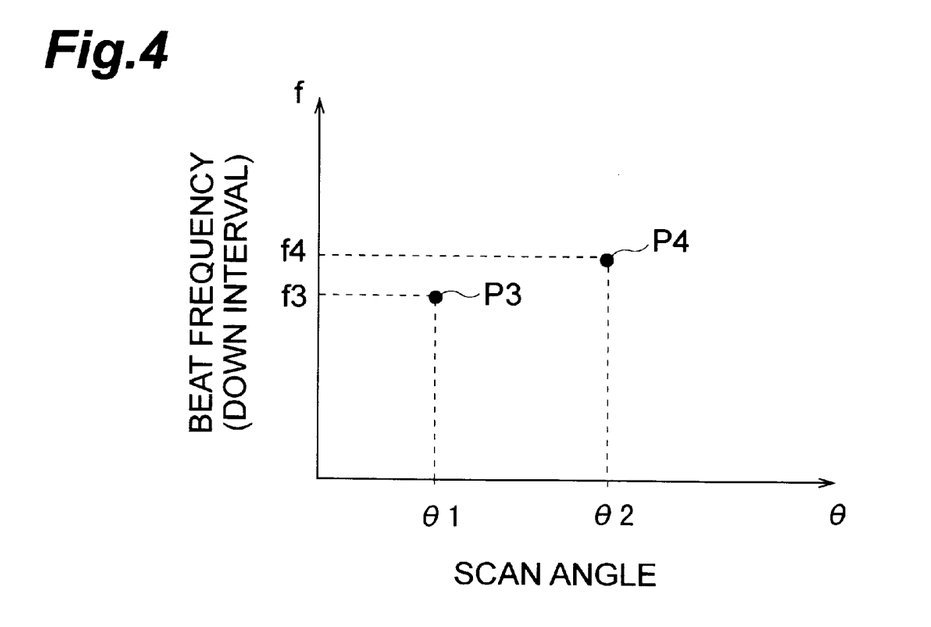
FIG. 4 is a graph for explaining pairing of level peaks and is a graph to show the relation between beat frequency in a down interval and scan angle.

FIG. 3 and FIG. 4 are graphs to show an example of level peaks in the up interval and in the down interval, respectively. As illustrated in FIG. 3, in the up interval a level peak P1 at the beat frequency f1 is obtained in the direction of scan angle θ1 and another level peak P2 at the beat frequency f2 in the direction of scan angle θ2. As illustrated in FIG. 4, in the down interval a level peak P3 at the beat frequency f3 is obtained in the direction of scan angle θ1 and another level peak P4 at the beat frequency f4 in the direction of scan angle θ2. In this example, P1 and P3 are paired and P2 and P4 are paired.

With the two level peaks thus paired, the distance and the relative speed are computed from their beat frequencies in accordance with the basic principles of the FM-CW radar apparatus described below.

Let f0 be the center frequency of the transmitted signal, ΔF be the frequency modulation width, fm be the modulation frequency of FM, fr be a beat frequency against when the relative speed of a target is zero (which is a beat frequency in a narrow sense), fd be a Doppler frequency based on the relative speed, fb1 be the beat frequency in the up interval, and fb2 be the beat frequency in the down interval. Then the following equations hold.

$$fb1 = fr - fd \qquad (1)$$

$$fb2=fr+fd \quad (2)$$

Hence, fr and fd can be obtained from Eqs. (3) and (4) below once the beat frequencies fb1 and fb2 are measured separately in the up interval and in the down interval of modulation cycle.

$$fr=(fb1+fb2)/2 \quad (3)$$

$$fd=(fb2-fb1)/2 \quad (4)$$

Once fr and fd are gained, the distance R and relative speed V of target can be computed according to Eqs. (5) and (6) below.

$$R=(C/(4 \cdot \Delta f \cdot fm)) \cdot fr \quad (5)$$

$$V=(C/(2 \cdot f0)) \cdot fd \quad (6)$$

In these equations C represents the speed of light.

For the pair of P1 and P3, the distance and relative speed can be obtained by putting the beat frequencies f1 and f3 into fb1 and fb2 of Eq. (3) and Eq. (4). The scan angle, distance, and relative speed at this time will be called point data of this pair. Likewise, for the pair of P2 and P4, the distance and relative speed can be computed by putting the beat frequencies f2 and f4 into fb1 and fb2 of Eq. (3) and Eq. (4). The point data is also obtained for this pair.

In step S18, as described above, the pairing is carried out as for as possible between the level peaks in the up interval and in the down interval and the point data is obtained for each pair.

Next, the processor moves to step S19 to carry out the first grouping operation for the point data obtained. The point data corresponding to one target is not always one, but the number of point data corresponding to one target increases as scanning resolution becomes higher. Thus the point data having consecutive positions and almost equal relative speeds is grouped in one group and an average is calculated from the positions and relative speeds of the respective point data. Since it can be considered that these averages represent the position and relative speed of the target more or less, they can be mentioned as target data. The plural point data grouped and the target data together will be called group data.

However, since the second grouping will be also carried out under a different condition later on, the first grouping described above will be called prior grouping, and the target data as the result of the prior grouping and the group data including it will be called prior target data and prior group data, respectively. The position stated herein means a location on a plane, which is specified by a distance and a scan angle.

Figure 5:
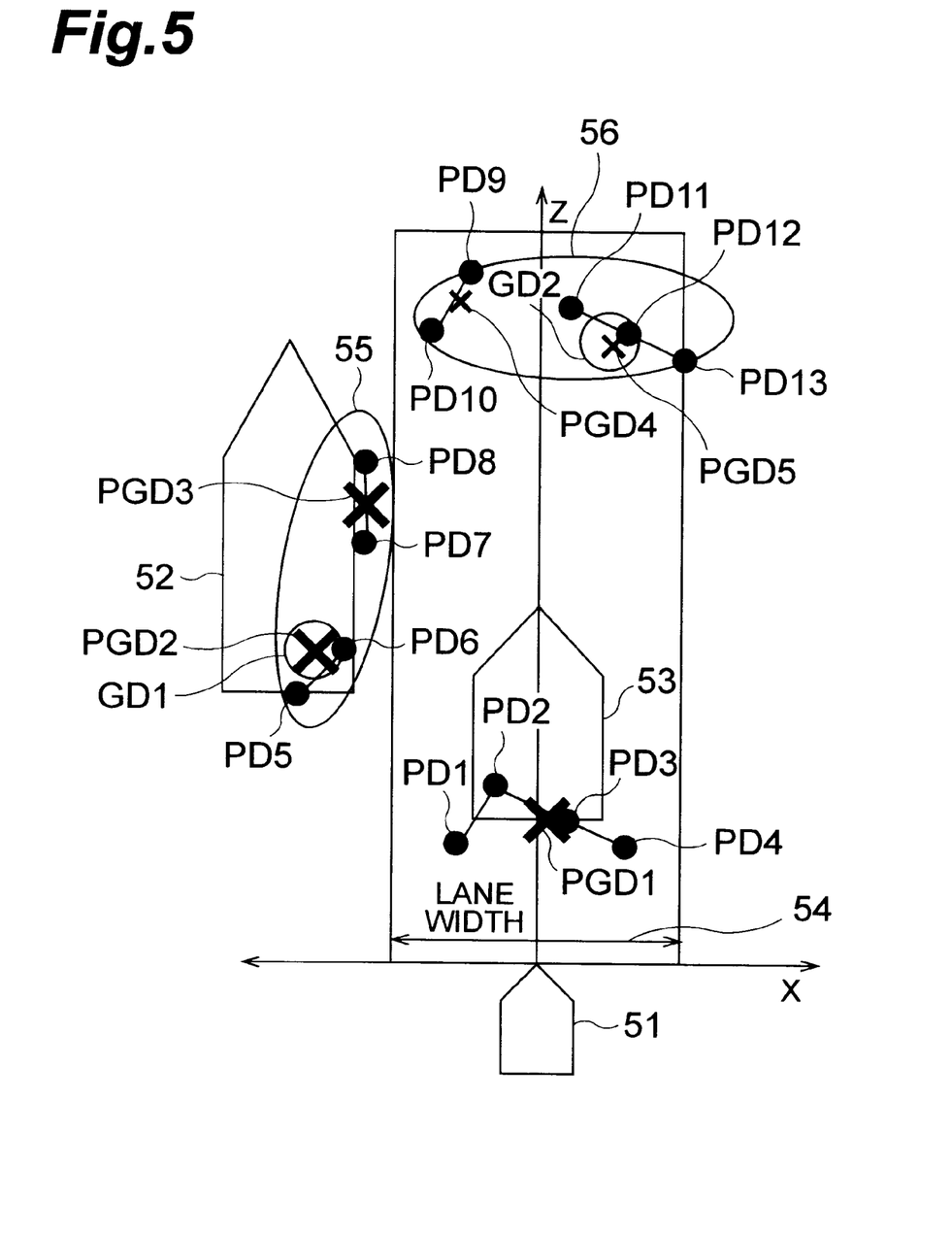
FIG. 5 is a diagram for explaining the grouping operation of point data.

Now let us explain the relation between target and point data and the significance of the prior grouping with a specific example. FIG. 5 is a diagram to show the positional relation between preceding vehicles as targets and point data obtained by beam scanning. In the same figure, the on-vehicle radar apparatus of the present embodiment is mounted on a vehicle 51 and vehicles 52, 53 are present ahead of the vehicle 51. The point data PD1 to PD4 is data obtained based on reflection of the transmitted signal at the vehicle 53, and the point data PD5 to PD8 is data obtained based on reflection of the transmitted signal at the vehicle 52.

Since the point data PD1 to PD4 has consecutive positions, they are grouped into one group by the operation in step S19 and averages are calculated from the positions and relative speeds of the point data PD1 to PD4, thus obtaining the prior group data PGD1. Since all the point data PD1 to PD4 based on the vehicle 53 is grouped by this prior grouping, the prior target data included in the prior group data PGD1 accurately indicates the typical position and relative speed of the vehicle 53.

On the other hand, as for the point data PD5 to PD8 based on the vehicle 52, the point data PD5 and PD6 having consecutive positions is grouped to obtain prior group data PGD2, while the point data PD7 and PD8 having consecutive positions is grouped to obtain prior group data PGD3. In this way two prior group data corresponds to the vehicle 52. If it is assumed at this point that the prior group data and targets are in one-to-one correspondence, incorrect detection will be made as if there exist two objects at the position of the vehicle 52. However, the recognition of target is not carried out at this point yet in this on-vehicle radar apparatus.

The prior grouping operation is also carried out similarly for the other point data PD9 to PD13, thereby obtaining prior group data PGD4, PGD5.

Next, the processor moves to step S20 to carry out the second grouping operation. The second grouping operation is an operation of further grouping the prior group data, which is characterized by applying different grouping conditions, depending upon their positions. In this operation each point data not grouped in the first grouping operation is also handled as one prior group data.

Figure 6:
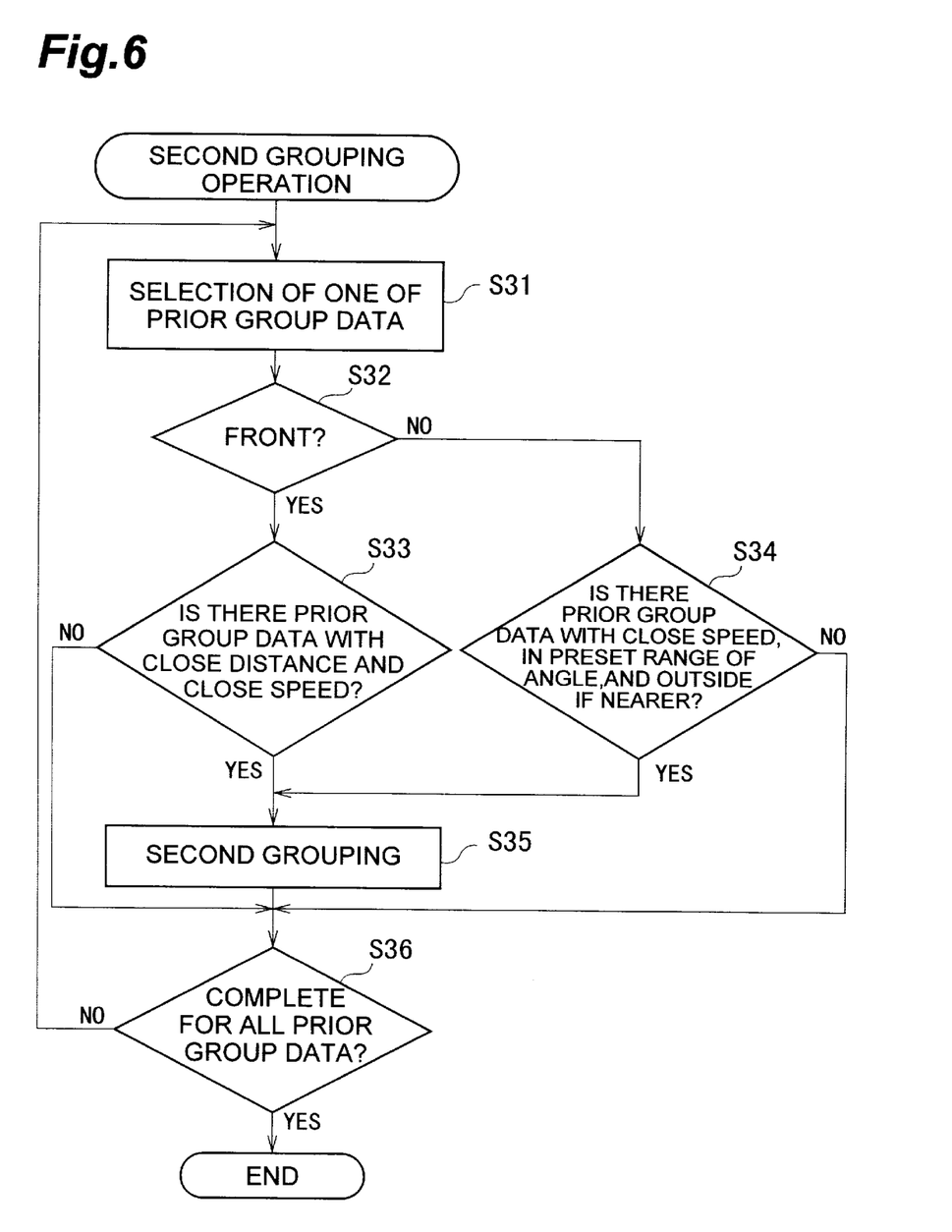
FIG. 6 is a flowchart to show the second grouping operation.

FIG. 6 is a flowchart to show a routine of the second grouping operation. First, step S31 is a step of selecting one prior group data and step S32 is a step of determining whether the position of the prior group data is in the front direction. If it is in the front direction the processor goes to step S33 to determine whether there is another prior group data having the distance and relative speed both almost equal to those of the selected group data. When the answer is yes, the processor goes to step S35 to carry out the second grouping operation of grouping all prior group data satisfying the above condition. The reason is that within the limited region of the front direction the data having equal distance and equal relative speed can be data based on one vehicle with a very high probability. Referring to FIG. 5, the prior group data PGD4 and PGD5 is grouped to obtain a new group 56. Typical values of the position and relative speed are not specified therefor yet at this point.

When it is determined in step S32 that the position of the prior group data of interest is not in the front direction, the processor goes to step S34. In step S34 it is determined whether there is another prior group data satisfying such conditions that the relative speeds of the two group data are almost equal, that the directional angles (scan angles) thereof are within a predetermined range, and that the nearer is outside. When it is affirmed, the processor moves to step S35 to group the prior group data satisfying these conditions to obtain new group data.

In the radar apparatus of the present embodiment in which the scan range thereof is the front in a predetermined range, directions other than the front direction are obliquely front directions. In the case of a target (vehicle) present at such an obliquely front location, reflection occurs at the rear end of the vehicle and at the side face of the vehicle, so that distances are not equal even if the beams are reflected from the common vehicle. Therefore, grouping according to actual circumstances can be achieved by carrying out the grouping of prior group data using the conditions as executed in step S34, i.e., the conditions that the relative speeds are almost equal, that the directional angles (scan angles) are within the predetermined range, and that the nearer is outside. Referring to FIG. 5, the prior group data PGD2 and PGD3 is grouped to obtain a new group 55. The group 55 accurately corresponds to the vehicle 52.

When the grouping in step S35 is completed or when the answer is negative in step S33 or in step S34, the processor transfers to step S36 to determine whether the grouping operation herein has been applied to all the prior group data. When the answer is negative, the processor returns to step S31 to carry out the second grouping operation for all the prior group data.

When the second grouping operation is completed in this way, the processor moves to step S21 to compare the current group data obtained in step S20 with the preceding group data. If any prior target data having substantially the same contents as the prior target data constituting the group data is absent in the previous group data, the averages of positions and relative speeds are calculated using the prior target data excluding it, and are designated as typical values of the current group data. Stable detection can be carried out against a lapse of time by carrying out such comparison with the previous data.

Figure 7:
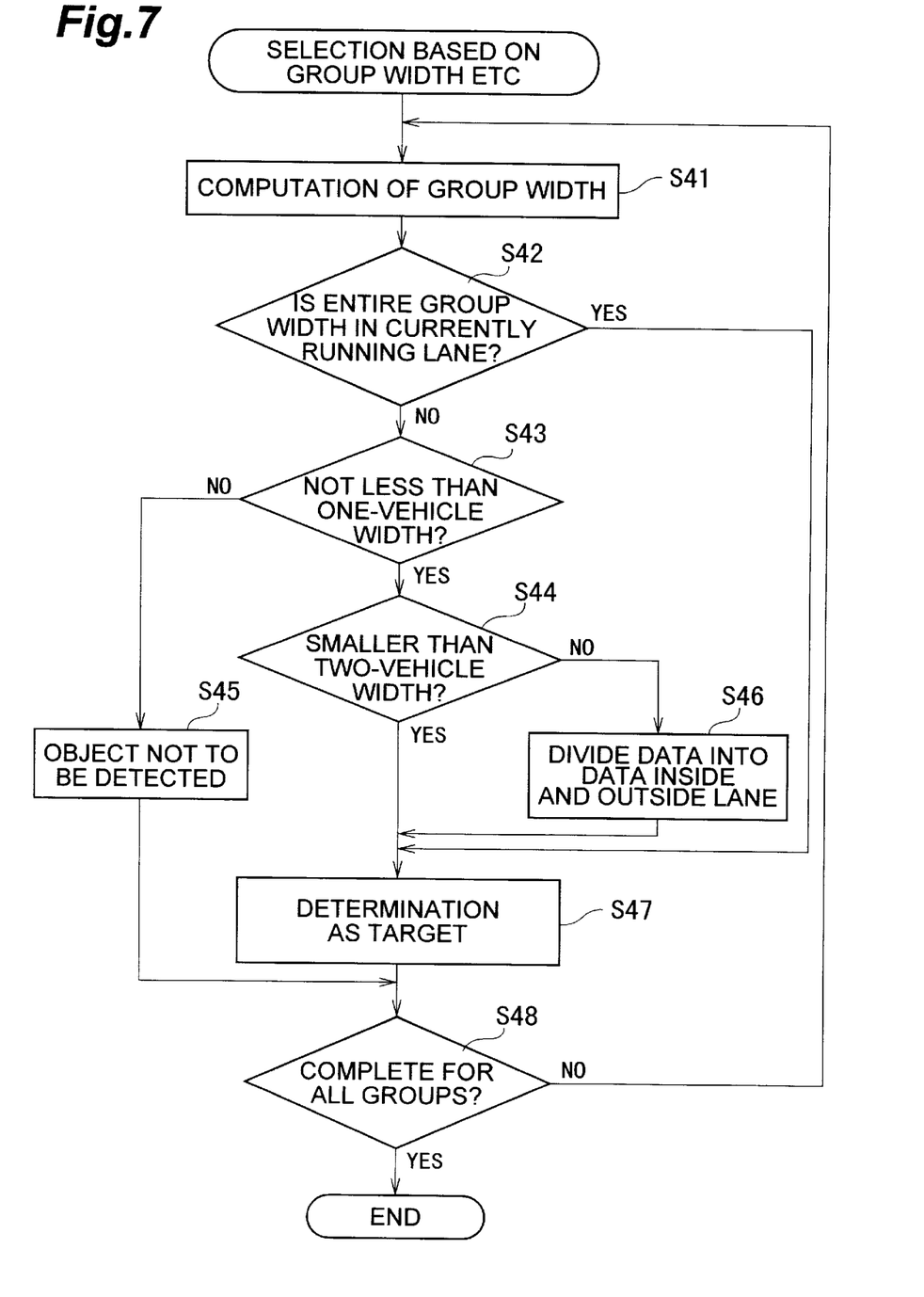
FIG. 7 is a flowchart to show a selection operation of group data based on the group width etc.
Figure 8:
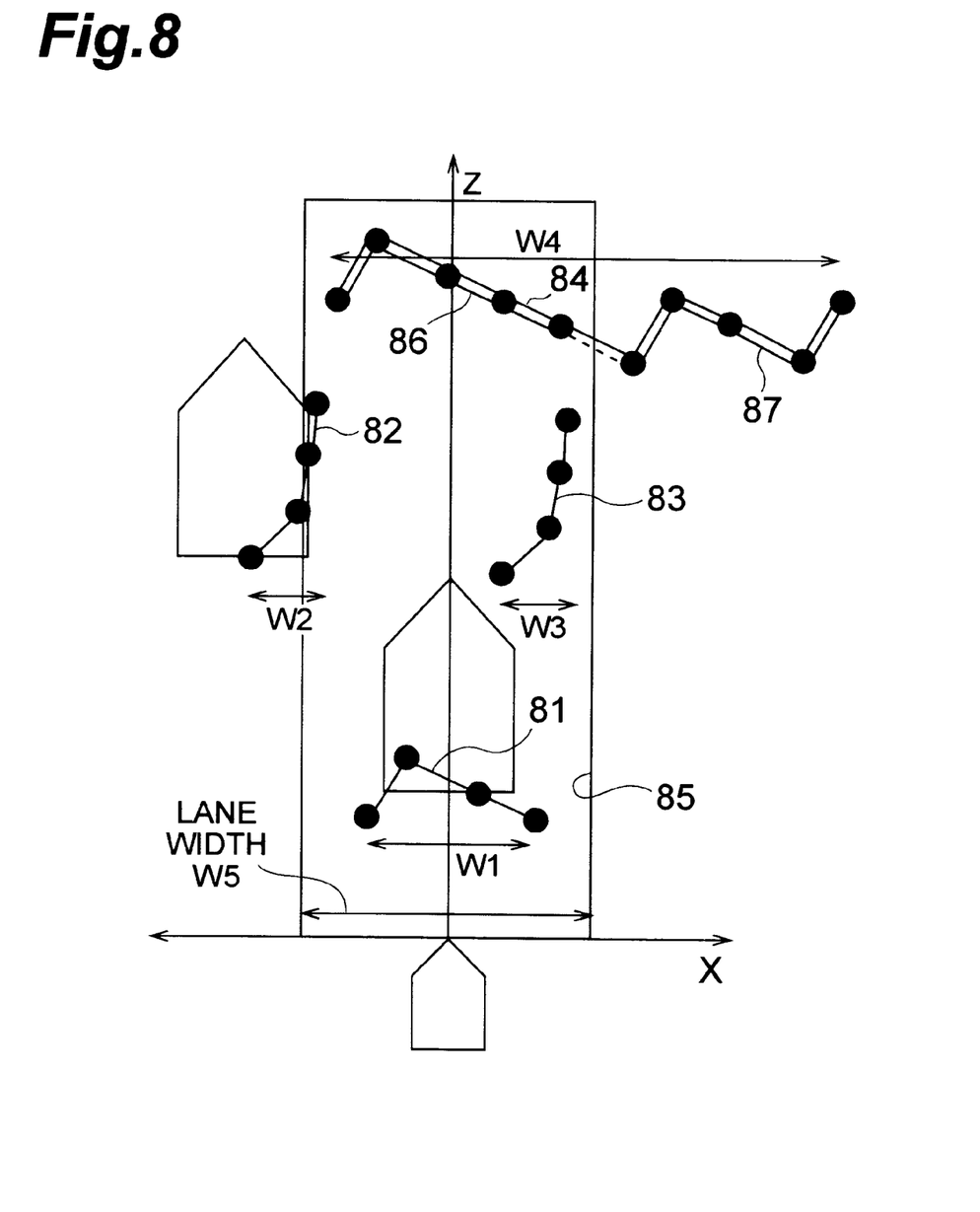
FIG. 8 is a diagram for explaining the selection operation of group data.

Then the processor goes to step S22. Step S22 is a step of carrying out selection of target based on the group width etc. of the group data obtained in step S21. FIG. 7 is a flowchart to show a routine of detailed processing in this step S22 and FIG. 8 is a diagram to show an example of various group data as objects to be processed.

First, step S41 is a step of computing the group width of group data. The group width herein means a length along a direction normal to the running direction, i.e., along the direction of the lane width, which is a distance in the direction of the lane width from the left-end point data to the right-end point data in each group. FIG. 8 illustrates four group data 81 to 84 and the group widths of the respective groups are indicated by symbols W1 to W4. The group width can be computed on a geometrical basis from the positions of the left-end point data and the right-end point data.

Then the processor moves to step S42 to determine whether the entire group width of each group is within the currently running lane. In FIG. 8 the group data 81 and 83 is within the width W5 of the currently running lane and the group data 82 and 84 is off the width W5 of the currently running lane in part.

When the entire group width is within the width of the current lane, the processor transfers to step S47 to conclude that the group data indicates a target to be detected. Based on this, any object entirely present in the currently running lane is identified as a detection target, irrespective of the magnitude of the width of the object.

On the other hand, when part or the whole of the group width is off the width W5 of the current lane, the processor goes from step S42 to step S43 to determine whether the group width is not less than a preset vehicle width of ordinary vehicles. If the group width is smaller than the vehicle width of one vehicle, the processor goes to step S45 to conclude that it is a target not to be detected. Based on this, a target deviating at least in part from the current lane is determined as an object not to be detected, if it has the width smaller than the width of one vehicle. For example, the group data 82 in FIG. 8 has the group width W2 smaller than the one-vehicle width, and it is thus concluded in step S45 that the group data 82 is not a target to be detected.

When it is determined in step S43 that the group width is not less than the vehicle width of one vehicle, the processor goes to step S44 to determine whether the width is smaller than the vehicle width of two vehicles. When the answer is yes, the processor moves to step S47 to conclude that the group data is one concerning a target to be detected. In FIG. 8, since the group data 81 has the group width WI not less than the one-vehicle width but smaller than the two-vehicle width, it is concluded in step S47 that the group data 81 indicates a target to be detected.

When step S44 results in no, that is, when it is determined that the group width is not less than the two-vehicle width, the processor transfers to step S46 to divide the group data into data inside and data outside the currently running lane. In FIG. 8 the group data 84 is the case. Since the group width W4 is not less than the two-vehicle width, the data is divided into left data and right data at the border of right border line 85 of the currently running lane to obtain new group data 86 and 87. The group data 86 in the current lane is considered to be a target to be detected in step S47, while the group data 87 outside the current lane is handled as unprocessed group data as to this processing routine. Therefore, the operations of step S41 and after are carried out soon or later for the group data 87.

After the operation in step S22 is completed as described above, the processor moves to step S23 to carry out the recognition operation of target, based on the group data thus obtained. In this step, a type and future motion of each target are estimated, including time-sequential motion of target or the like.

In the present embodiment the shape of the currently running lane is preliminarily determined as a fixed value under the assumption of straight-ahead running. If the shape of the current lane upon cornering, i.e., the shape of the current lane of a curved road, as well as the shape of the current lane of a straight road, can be acquired by computation from the vehicle speed, steering angle, yaw rate, etc. or from the result of detection by lane marker detecting means or the like, it is, however, desirable to carry out the comparison with the group data etc. by use of the result of acquisition.

Although the on-vehicle radar apparatus of the present embodiment is the DBF radar apparatus, the radar apparatus of the present invention may also be a mechanical scanning type radar apparatus instead thereof.

As described above, the radar apparatus of the present invention can perform more accurate grouping, because the different grouping conditions are used depending upon the position of point data in the grouping operation for matching a plurality of point data detected, with targets to be detected.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A radar apparatus for use on a vehicle and for detecting one target or two or more targets present in a scan range by scanning the scan range with a radar beam, said radar apparatus comprising:

means for obtaining prior target data by said scanning with the radar beam;

grouping means for carrying out grouping of said prior target data according to a predetermined condition to obtain group data; and target recognition means for identifying the group data and the prior target data remaining without being grouped, as detection data corresponding to respective targets and carrying out recognition of each target corresponding to each detection data, wherein said grouping means makes provision of a plurality of said predetermined conditions, selects one condition or two or more conditions according to position information of prior target data to be grouped, and carries out the grouping based on the condition or conditions thus selected.

2. The radar apparatus according to claim 1, wherein said grouping means carries out the grouping of prior target data present in a front direction with another prior target data, based on such a condition that distances and relative speeds are approximately equal, and wherein said grouping means carries out the grouping of prior target data present obliquely ahead with another prior target data, based on such a condition that directional angles and relative speeds are approximately equal.

3. The radar apparatus according to claim 1, further comprising lane shape acquiring means for acquiring a shape of a currently running lane ahead of the vehicle, wherein said grouping means carries out the grouping of prior target data present within a range of the currently running lane acquired by said lane shape acquiring means, with another prior target data, based on such a condition that distances and relative speeds are approximately equal, and wherein said grouping means carries out the grouping of prior target data present outside said range of the currently running lane with another prior target data, based on such a condition that directional angles and relative speeds are approximately equal.

4. The radar apparatus according to claim 3, wherein when a target width based on said group data is not less than a predetermined value and when at least part of the target width is off the width of the currently running lane acquired by said lane shape acquiring means, two new group data is generated by dividing said group data into data inside and data outside said currently running lane.

* * * * *